(12) United States Patent
Synovic et al.

(10) Patent No.: US 7,386,865 B2
(45) Date of Patent: Jun. 10, 2008

(54) SYSTEM AND METHOD FOR PROCESSING REMOTE FUNCTION CALLS

(75) Inventors: Michael J. Synovic, Lindenhurst, IL (US); Curtis E. Bergeron, Lindenhurst, IL (US)

(73) Assignee: SAP AG, Walldorf (DE)

( * ) Notice: Subject to any disclaimer, the term of this patent is extended or adjusted under 35 U.S.C. 154(b) by 700 days.

(21) Appl. No.: 10/874,170

(22) Filed: Jun. 24, 2004

(65) Prior Publication Data

US 2006/0037032 A1    Feb. 16, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................... 719/330; 719/316
(58) Field of Classification Search ................ 719/330
See application file for complete search history.

(56) References Cited

U.S. PATENT DOCUMENTS

| | | | | |
|---|---|---|---|---|
| 5,146,593 A | * | 9/1992 | Brandle et al. | 719/328 |
| 5,915,112 A | * | 6/1999 | Boutcher | 719/330 |
| 6,006,278 A | * | 12/1999 | Cottrill | 719/330 |
| 6,192,418 B1 | * | 2/2001 | Hale et al. | 719/312 |
| 6,249,822 B1 | * | 6/2001 | Kays et al. | 719/330 |
| 6,487,607 B1 | * | 11/2002 | Wollrath et al. | 719/330 |
| 6,493,768 B1 | * | 12/2002 | Boutcher | 719/330 |
| 6,959,307 B2 | * | 10/2005 | Apte | 707/104.1 |
| 7,080,092 B2 | * | 7/2006 | Upton | 707/102 |
| 7,210,148 B2 | * | 4/2007 | Arnold et al. | 719/330 |
| 2003/0093471 A1 | * | 5/2003 | Upton | 709/203 |
| 2003/0097345 A1 | * | 5/2003 | Upton | 705/401 |
| 2004/0078495 A1 | * | 4/2004 | Mousseau et al. | 710/1 |
| 2004/0158843 A1 | * | 8/2004 | Cloccarelli | 719/330 |

OTHER PUBLICATIONS

Sharma, R., Stearns,B., Ng, T., "J2EE Connector Architecture and Enterprise Application Integration", Dec. 2001, Prentice Hall, pp: Chapter 2,3,16, and 17.*

* cited by examiner

*Primary Examiner*—Van H. Nguyen
*Assistant Examiner*—KimbleAnn Verdi
(74) *Attorney, Agent, or Firm*—Kenyon & Kenyon LLP

(57) ABSTRACT

A method and system for processing a remote function call. According to one embodiment, an application receives from a local software component a request to execute an external software component, and makes one or more calls to a communications interface based on the received request, the communications interface including a standard set of routines for executing remote function calls.

14 Claims, 5 Drawing Sheets

SYSTEM AND METHOD FOR PROCESSING REMOTE FUNCTION CALLS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Today's software applications continue to grow in size and complexity. As a result, many applications, such as enterprise software applications that are deployed by organizations to implement business processes for example, are constructed from various components that are written in different programming languages and run in different runtime environments or on different platforms. Communications interfaces have been developed to enable such disparate application components to talk to each other; these interfaces usually employ a set of routines based on standard software specifications that are either widely used and accepted or are sanctioned by standards organizations.

An example of one such communications interface is the SAP Java Connector ("JCo"). The JCo was developed because most SAP business applications are programmed in SAP's ABAP programming language and run in the SAP R/3 system, but many application components have recently been developed in Java to take advantage of the interoperability fostered by the Java Virtual Machine runtime environment. The JCo interface enables Java clients to execute remote function calls to the R/3 system and vice-versa based on the Remote Function Call interface developed by SAP. A "remote function call" for the purposes of this application refers to a set of instructions that invoke an external software component (e.g., any type of routine, module, procedure or function). The remote function call may pass input parameters to the external software component and return output parameters resulting from the execution of the external component. An external software component refers to a software component that resides in a different physical location, is run in a different runtime environment, or is run on a different platform than the calling software component.

One disadvantage with such communications interfaces is that they require a developer of a software component to have a significant level of detailed knowledge of the technical aspects of the interface in order to correctly program the component to communicate with an external software component. Not only does the developer need to set the parameters (if any) for each remote function call and get the return parameters (if any) after execution of the remote function call, the developer also needs to program low-level execution details of the call that are irrelevant to the purpose of the particular remote function call to be made. Such implementation details include creating a connection to the remote system which hosts the external software component, performing error-checking routines, etc. When working on software components that include hundreds of remote function calls, this programming effort places an excessive burden on the developer.

Accordingly, there is a need in the art for a system and method for processing remote function calls without requiring developers to have a significant amount of technical understanding of the underlying communications interface.

SUMMARY OF THE INVENTION

Embodiments of the present invention provide for processing a remote function call. According to one embodiment, an application receives from a local software component a request to execute an external software component, and makes one or more calls to a communications interface based on the received request, the communications interface including a standard set of routines for executing remote function calls.

DETAILED DESCRIPTION

Figure 1:
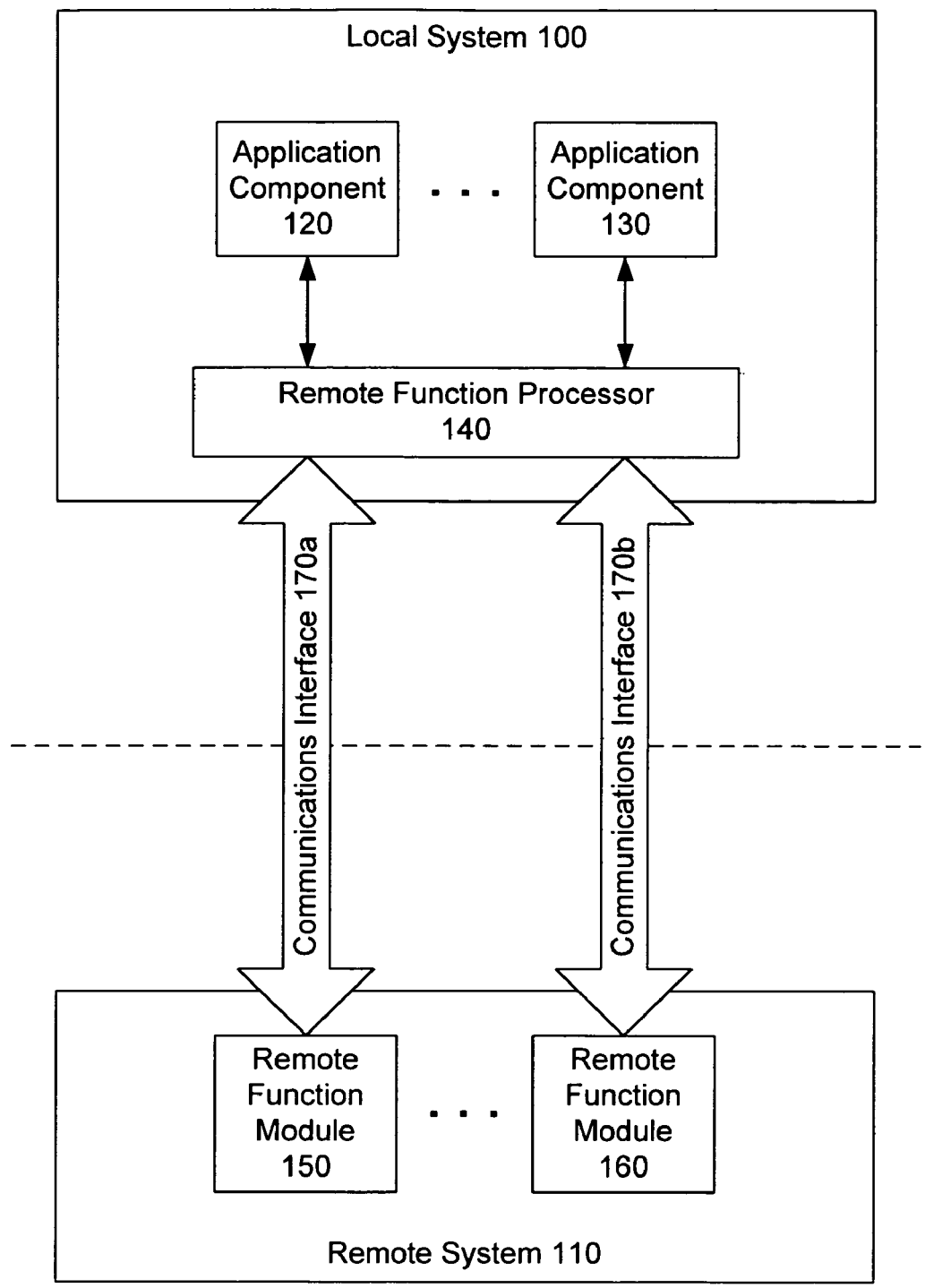
FIG. 1 is a block diagram that depicts a process for processing remote function calls in accordance with an embodiment of the present invention.

FIG. 1 depicts a block diagram for processing a remote function call in accordance with an embodiment of the present invention. In local system 100, a plurality of software components, such as application component 120 and application component 130, may utilize remote function processor 140 to handle the low-level execution details of executing remote function calls to external software components, such as remote function module 150 and remote function module 160 in remote system 110, via communications interface 170a and 170b respectively. Local system 100 and remote system 110 may or may not reside in the same hardware device. Without the benefit of the present invention, the low-level functionality coded in remote function processor 140 would have to be coded in each calling software component (i.e., application component 120 and application component 130), resulting in an excessive burden on the developer of those software components.

Figure 2:
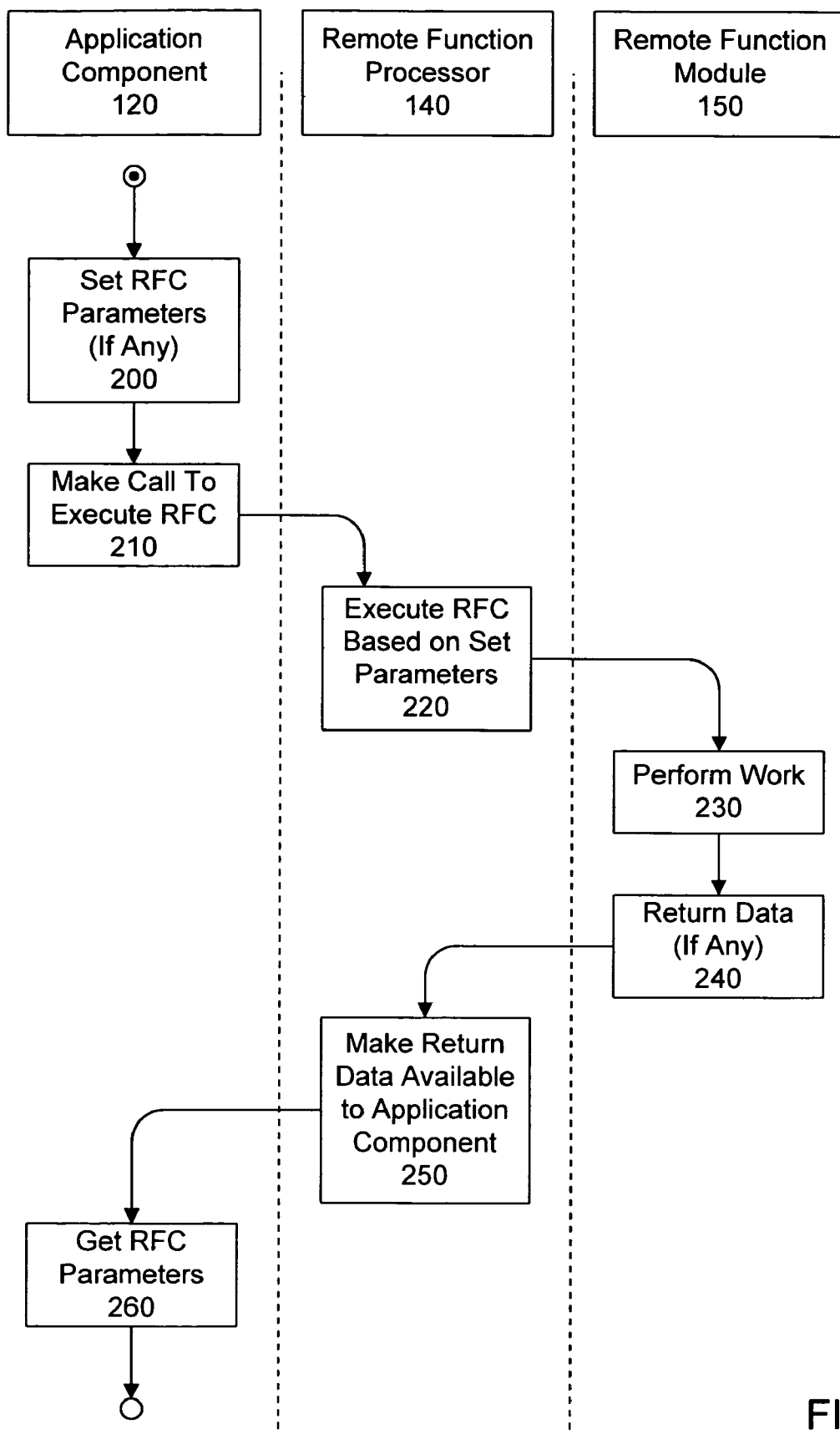
FIG. 2 is a sequence diagram that depicts a general call flow representing the processing of a remote function call in accordance with an embodiment of the present invention.

FIG. 2 depicts a general call flow representing the processing of a remote function call from application component 120 to remote function module 150 in accordance with an embodiment of the present invention. Application component 120 simply sets the parameters (if any) of the remote function call (step 200) and makes a call to execute the remote function call to remote function processor 140 (step 210). Remote function processor 140 then executes the remote function call based on the set parameters (step 220) by making one or more calls to communications interface 170a, which includes a standard set of routines for executing remote function calls. The one or more calls in part pertain to low-level execution details of the remote function call irrelevant to the purpose of the particular remote function call to be made, including such functionality as creating a connection to remote system 110 and performing error-checking routines, for example. Once remote function module 150 performs the requested work (step 230), it returns any output parameters resulting from the work performed to remote function processor 140 (step 240), which in turn makes the return data available to application component 120 (step 250) for subsequent retrieval (step 260).

Architecture

Figure 3:
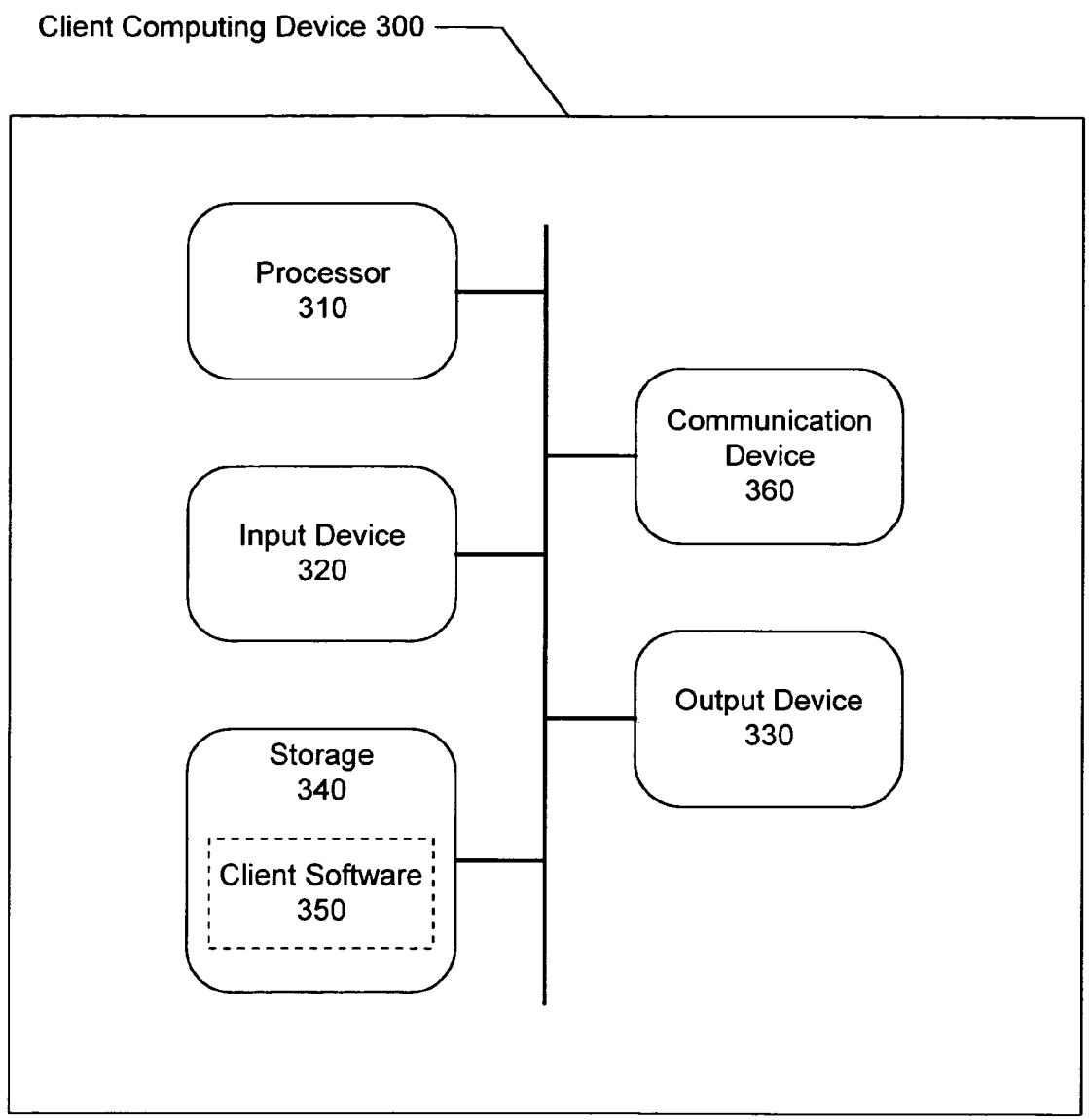
FIG. 3 is a block diagram that depicts a client computing device in accordance with an embodiment of the present invention.

FIG. 3 is a block diagram depicting the internal structure of client computing device 300 in accordance with an embodiment of the present invention. Client computing device 300 may be a personal computer, handheld personal digital assistant ("PDA"), or any other type of microprocessor-based device. Client computing device 300 may include one or more of processor 310, input device 320, output device 330, storage 340, and communication device 360.

Input device 320 may include a keyboard, mouse, pen-operated touch screen, voice-recognition device, or any other device that provides input from a user. Output device 330 may include a monitor, printer, disk drive, speakers, or any other device that provides output to user.

Storage 340 may include volatile and nonvolatile data storage, including one or more electrical, magnetic or optical memories such as a RAM, cache, hard drive, CD-ROM drive, tape drive or removable storage disk. Communication device 360 may include a modem, network interface card, or any other device capable of transmitting and receiving signals over a network.

Client software 350, which may be stored in storage 340 and executed by processor 310, may include the client side to a client/server application, such as an SAP CRM Workforce Management application that embodies the functionality of the present invention.

The components of client computing device 300 may be connected via an electrical bus or wirelessly.

Figure 4:
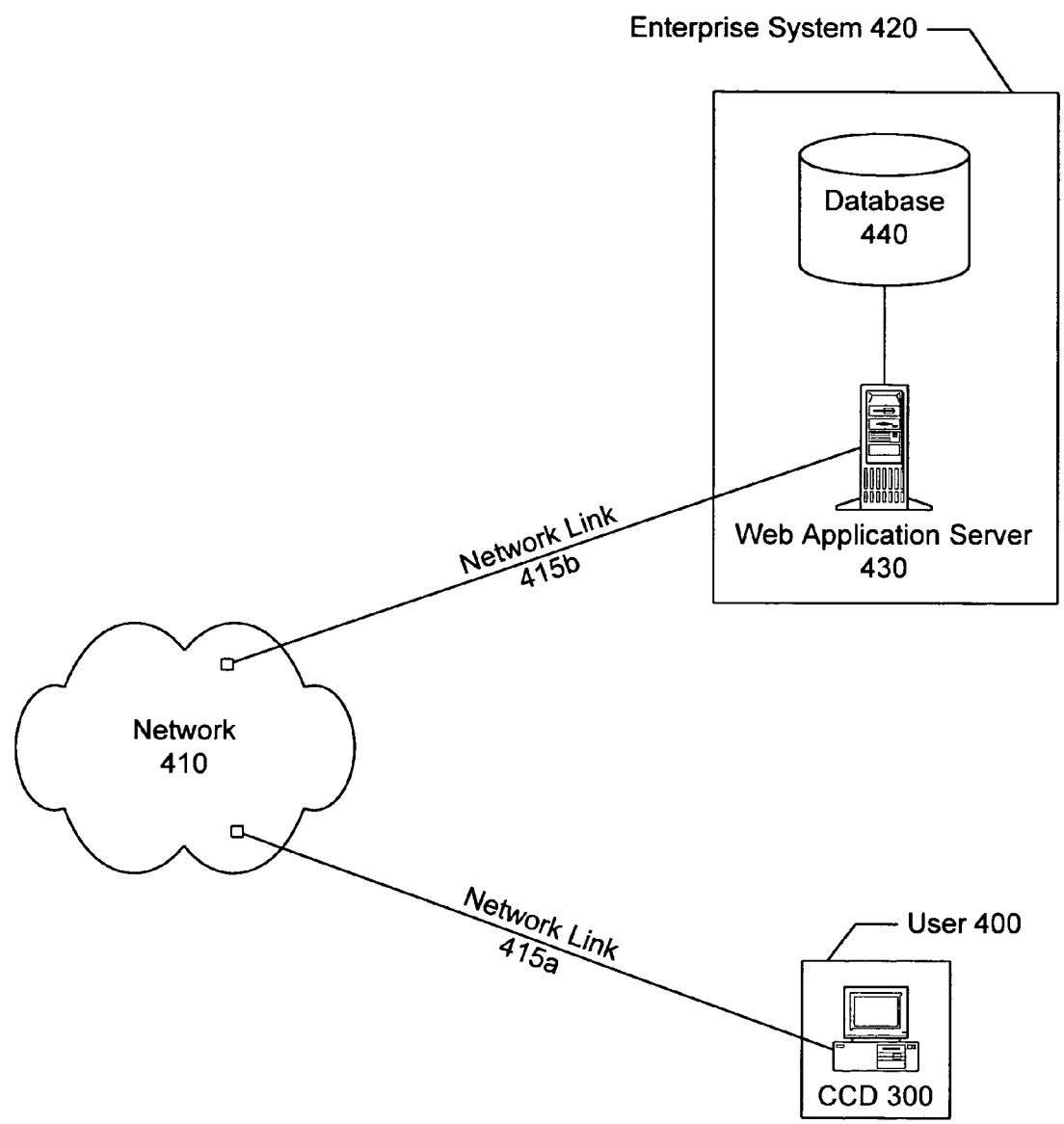
FIG. 4 is a block diagram that depicts a network architecture for an enterprise system in accordance with an embodiment of the present invention.

FIG. 4 is a block diagram depicting a network architecture for an enterprise system in accordance with an embodiment of the present invention. According to one particular embodiment, when user 400 invokes the CRM application that is part of enterprise system 420, client computing device 300 sends and receives via client software 350 requests to and from web application server 430 via network link 415a, network 410, and network link 415b.

Network link 415 may include telephone lines, DSL, cable networks, T1 or T3 lines, wireless network connections, or any other arrangement that provides a medium for the transmission and reception of network signals. Network 410 may include any type of interconnected communication system, which may be based on packets, cells or circuits.

Network 410 may implement any number of communications protocols, including TCP/IP (Transmission Control Protocol/Internet Protocol). The communication between CCD 300 and web application server 430 may be secured by any security protocol, such as SSL (Secured Sockets Layer).

Web application server 430 includes a processor and memory for executing program instructions, as well as a network interface, and may include a collection of servers working in tandem to distribute the network functionality and load. In one particular embodiment, web application server 430 may include a combination of enterprise servers such as a web application server, a web user interface server and a database server, all of which could be manufactured by Sun Microsystems, Inc. Web application server 430 could run an HTTP server program in one embodiment, such as Apache®, as a process under an operating system such as UNIX® (or any variant thereof). Database 440 may be part of a relational database program, such as MySQL® that may be run as a process by a database server within the UNIX® operating system, for example.

Software components residing in web application server 420 may take the form of custom-written programs and libraries that run, either interpreted or compiled, in part as a result of HTTP requests received by web application server 430. These programs may be written in any programming language, such as ABAP, C, C++ or Java. The software components may be built on a web-based enterprise application platform, such as an SAP Web Application Server, and may include an SAP CRM Workforce Management application embodying the functionality of the present invention.

In one embodiment, web application server 430 could include both an SAP R/3 engine that hosts software components which could be written in ABAP, and a J2EE engine that hosts software components which could be Enterprise JavaBeans (EJB) written in Java.

Example Embodiment

Figure 5:
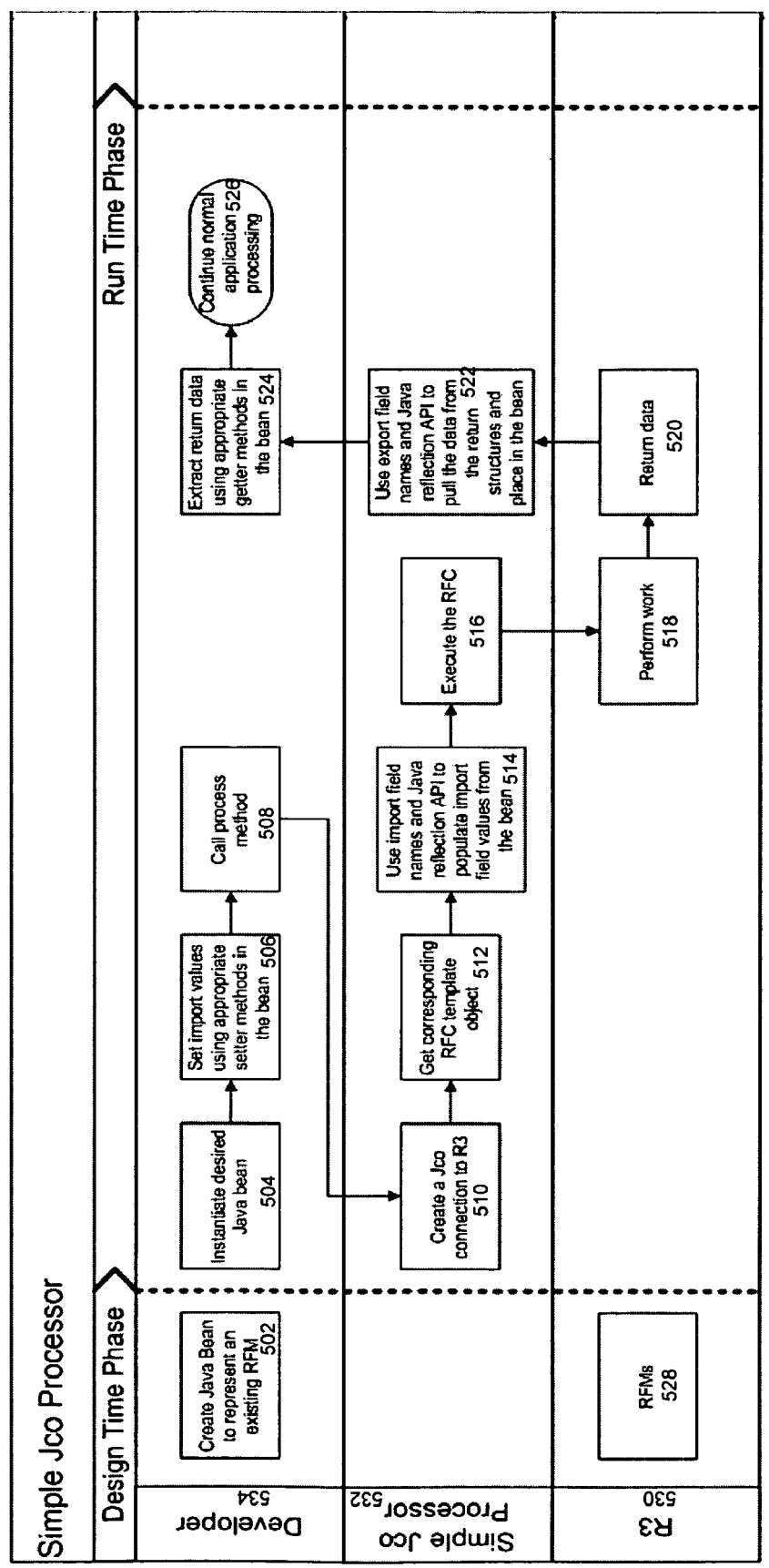
FIG. 5 is a sequence diagram that depicts a specific call flow representing the processing of a remote function call in accordance with an embodiment of the present invention.

FIG. 5 depicts a specific call flow representing the processing of a remote function call using the JCo in accordance with an embodiment of the present invention. The design time phase of FIG. 5 illustrates the results of the implementing developers who develop the remote function modules in the SAP R/3 system (step 528) and a JavaBean to represent one of the existing remote function modules (step 502). Once developed and deployed, an application developer (e.g., developer 534) need only instantiate the desired JavaBean (step 504), set import values using the bean's setter methods (if any) (step 506) and call a process method (step 508) to execute a remote function call.

For example, the application developer may instantiate a new instance of the bean that represents the desired remote function module by coding:

OrgStartupGetList data=new OrgStartupGetList( );

The application developer may populate the import values into the bean by coding:

data.setIv_org_objid("0000001");

And the application developer may call the process method by coding:

data.process( );

Based on this example, one can see that for the application developer it is extremely simple to execute a remote function call. The developer need not know anything about the details of the JCo; he or she only needs to know which bean to create and how to populate the import values using simple set methods.

This JavaBean may look like the following as programmed by an implementing developer:

```
import com.saplabs.sis.businessobject.SISBusinessObjectBase;
public class OrgStartupGetList extends SISBusinessObjectBase{
    public OrgStartupGetList( )       {
        this.setRfcname("WFM_ORG_STARTUP_GETLIST");
    }
    public String getIv_org_objid( ) {
        return iv_org_objid;
    }
    public void setIv_org_objid(String iv_org_objid) {
        this.iv_org_objid = iv_org_objid;
    }
    public java.util.List getEt_filter_data( ) {
```

```
        return et_filter_data;
    }
    public void setEt_filter_data(java.util.List et_filter_data) {
        this.et_filter_data = et_filter data;
    }
    public String getEt_filter_datastructure( ) {
        return et_filter_datastructure;
    }
    private String iv_org_objid;
    private java.util.List et_filter_data;
    private String et_filter_datastructure =
"com.saplabs.sis.businessobject.structure.Wfmcast_Name_Id_List";
}
```

As shown, one can see that this is a very simple JavaBean. It has a setter and getter method for the import parameter (iv_org_objid) and for the return parameter (et_filter_data). These parameter names map directly to the import and export parameters in the SAP Remote Function Call interface (Wfm_Org_Startup_Getlist).

Because a software component can have literally hundreds of these beans some common methods may be placed in a base class that all the beans extend (SISBusinessObjectBase). One of these common methods is the process( ) method which creates an instance of the simple JCo processor (i.e., remote function processor 140) and passes itself to it:

```
/**
* workflow method for making a RFC call through JCO
*
* @exceptions BackendException
*/
public void process( )
        throws SISBackendException {
    //make sure there is a BO to process
    if (this.sisBO == null) {
        return;
    }
    try {
        //create a connection
        createConnection( );
        //create the function
        function = con.getJCoFunction(sisBO.getRfcname( ));
        //set the parameters
        setImportParameters( );
        //execute the bapi
        con.execute(function);
        //package returned data into BO
        setExportParameters( );
        // Check the BapiRet structure for errors
        .
        .
        .
    }
}
```

```
/**
* this is a workflow method for processing the business object by the
* <code>SISBackend</code> object
*/
public void process ( )
        throws SISBackendException{
    SISBackend backend = null;
    try {
        backend = (SISBackend)
            this.bem.createBackendBusinessObject(SISBackend.GBBO, sisBeBoParams);
        backend.setBusinessObject(this);
        backend.process( );
    }catch(BackendException excp) {
        // Wrap the exception in a SIS exception and pass up the chain
        throw new SISBackendException(ErrorMessageIds.GenericBackend, excp);
    }
    finally {
        if( null != backend ) {
            backend.destroyBackendObject( );
        }
    }
}
```

The SISBackend object is an instance of the simple JCo processor object. One can see that this implementation of the process method follows the same steps that the application developer follows: create an instance of the object, populate import values, and call the process method.

Returning to the example in FIG. 5, once the JavaBean's process method has been called, the simple JCo processor handles the low-level execution details of executing the remote function call: creating a JCo connection to R/3 (step 510), retrieving the corresponding SAP Remote Function Call interface template object (step 512), populating the import field values from the bean (step 514) and executing the SAP Remote Function Call (step 516). The following is a code snippet of an actual simple Jco processor process( ) method implementation:

Of course, all of this code is hidden from the application developer; all the developer needs to know is how to call the public process( ) method. Once the remote function module performs the requested work (step 518), it returns the data (if any) to the simple JCo processor (step 520), which pulls the data from the return structures and places it in the bean (step 522). A simple getter method as shown above is utilized to retrieve the return data (step 524) and normal application processing is continued (step 526.

With respect to the last getter function of the JavaBean detailed above, one may notice that the return parameter is actually a collection of Wfmcast_Name_Id_List beans. The simple JCo processor knows that a collection needs to be created because it reads the metadata for the return structure in the function template (retrieved in step 512). This metadata tells the processor that the return structure for et_filter_data is a table. Since the simple JCo processor knows it is dealing with a table structure it determines which bean to create for each entry of the collection by calling the getEt_filter_datastrucure( ) method. This method returns the fully qualified object name of the "row" bean to use. The simple JCo processor uses this value to create a new instance of the row bean. (It is named a "row" bean because one bean gets created for each row of the returned table.)

In this embodiment of the present invention, this workflow may also be enhanced in various ways. For instance, a Process Manager object may be created to handle a multi-treaded use case (more that one SAP Remote Function Call executed simultaneously). If more than one remote function module needs to be executed during a transaction then the application developer can pass a list of bean objects to a Manager class which will generate a new thread of execution for each bean and execute them simultaneously. This manager may be a generic object that can perform this operation regardless of the number of JavaBeans provided or the remote function module that is encapsulated by the bean.

Additionally, a caching mechanism may be implemented for JavaBean property descriptors to improve system performance. In order to call a method using the Java reflection API one first needs to introspect an object and create property descriptor objects for each method. Rather than perform this introspection each time a bean is used, which could be literally thousands of times, these objects are created once, cached and then pulled from cache whenever needed.

Also, an automated tool may be created to automatically generate the bean objects and add them to a project; this effectively eliminates the work required to map a bean to a remote function module.

And because the setter and getter methods of the beans are strongly typed, integrated development environments can easily inform an application developer of the required type information through code assist. The strong typing also allows a compiler to perform type checking during design time rather than runtime.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for processing a remote function call, comprising:
for each of a plurality of remote procedures residing on a remote system, creating a calling object on a client for calling each of the remote procedures, each of the remote procedures having import parameters and export parameters, and each of the calling objects including a setter method for setting local import values for the respective import parameters and including a getter method for getting local export values for the respective export parameters;
creating a processing object on the client for processing each of the calling objects;
instantiating the calling object for calling the respective remote procedure;
populating the local import values for the respective remote procedure using the setter method of the calling object;
calling the processing object;
the processing object receiving from the calling object a request to execute the respective remote procedure;
the processing object retrieving a template from the remote system for setting the import parameters for the respective remote procedure;
the processing object converting the local import values into the import parameters;
the processing object making one or more calls to a communications interface based on the received request, the communications interface including a standard set of routines for executing remote procedures;
the processing object receiving the export parameters from the remote site;
the processing object converting the export parameters into the local export values; and
getting the local export values using the getter method of the calling object.

2. The method of claim 1, wherein the calling object resides in a different physical location than the remote procedure.

3. The method of claim 1, wherein the calling object runs in a different runtime environment than the remote procedure.

4. The method of claim 3, wherein the calling object resides in the same hardware device as the remote procedure.

5. The method of claim 1, wherein the calling object runs on a different platform than the remote procedure.

6. The method of claim 5, wherein the calling object resides in the same hardware device as the remote procedure.

7. The method of claim 1, wherein the one or more calls include a call to connect to a remote system hosting the remote procedure and a call to retrieve a corresponding remote procedure interface template object.

8. An apparatus for processing a remote function call, comprising:
a processor; and
a memory, coupled to the processor, storing instructions adapted to be executed by the processor to:
for each of a plurality of remote procedures residing on a remote system, creating a calling object on a client for calling each of the remote procedures, each of the remote procedures having import parameters and export parameters, and each of the calling objects including a setter method for setting local import values for the respective import parameters and including a getter method for getting local export values for the respective export parameters;
creating a processing object on the client for processing each of the calling objects;
instantiating the calling object for calling the respective remote procedure;
populating the local import values for the respective remote procedure using the setter method of the calling object;
calling the processing object;
the processing object receiving from the calling object a request to execute the respective remote procedure;
the processing object retrieving a template from the remote system for setting the import parameters for the respective remote procedure;
the processing object converting the local import values into the import parameters;
the processing object making one or more calls to a communications interface based on the received request, the communications interface including a standard set of routines for executing remote procedures;

the processing object receiving the export parameters from the remote site;

the processing object converting the export parameters into the local export values; and getting the local export values using the getter method of the calling object.

9. The apparatus of claim 8, wherein the calling object resides in a different physical location than the remote procedure.

10. The apparatus of claim 8, wherein the calling object runs in a different runtime environment than the remote procedure.

11. The apparatus of claim 10, wherein the calling object resides in the same hardware device as the remote procedure.

12. The apparatus of claim 8, wherein the calling object runs on a different platform than the remote procedure.

13. The apparatus of claim 12, wherein the calling object resides in the same hardware device as the remote procedure.

14. The apparatus of claim 8, wherein the one or more calls include a call to connect to a remote system hosting the remote procedure and a call to retrieve a corresponding remote procedure interface template object.

* * * * *